United States Patent [19]

Sturgis

[11] Patent Number: 5,172,723
[45] Date of Patent: Dec. 22, 1992

[54] QUICK-CONNECT COUPLING

[76] Inventor: Malcolm B. Sturgis, 555 Fee Fee Rd., Maryland Heights, Mo. 63043

[21] Appl. No.: 815,392

[22] Filed: Dec. 31, 1991

[51] Int. Cl.⁵ .............................................. F16L 37/38
[52] U.S. Cl. ................................. 137/613; 251/149.1; 251/149.9
[58] Field of Search .................... 137/613, 614, 614.02, 137/614.05, 614.06; 251/149.1, 149.9

[56] References Cited

U.S. PATENT DOCUMENTS

| | | | |
|---|---|---|---|
| 3,680,591 | 8/1972 | Vik | 137/614 |
| 4,009,729 | 3/1977 | Vik | 137/614.06 X |
| 4,290,440 | 9/1981 | Sturgis | 137/75 |
| 4,552,333 | 11/1985 | Niemi | 137/614.06 X |
| 4,974,623 | 12/1990 | Sturgis | 137/75 X |
| 5,020,563 | 6/1991 | Hoffman et al. | 137/75 |

OTHER PUBLICATIONS

OPW Kamvalok (Model No. OPW D-2000 Coupler Model 22610), Dover Corp./OPW Division, pp. 1-3, 1988, Cincinnati, Ohio.
9200 Lever Coupling, Parker Fluid Connectors, pp. 21-22, 1990 Minneapolis, Minn.

*Primary Examiner*—Martin P. Schwadron
*Assistant Examiner*—Kevin L. Lee
*Attorney, Agent, or Firm*—Senniger, Powers, Leavitt & Roedel

[57] ABSTRACT

A quick-connect coupling for connecting a gas line to a gas appliance. The coupling comprises a nipple and a socket member with a socket for receiving the nipple. A sleeve is slidable on the socket member from a retracted position in which the nipple may be inserted into the socket, to a locking position in which the nipple is held captive in the socket, and then back to the stated retracted position for disconnection of the nipple from the socket member. A first valve is biased toward a closed position and automatically opens upon insertion of the nipple into the socket. A second valve is manually movable by means of a lever on the socket member from a fully open position for permitting maximum flow of fluid through the flow passage, through a range of movement in which it is only partially open, to a fully closed position. A detent member movable conjointly with the lever is engageable by the sleeve to prevent it from being moved to its retracted position when the second valve is fully or partially open. The detent member is movable to a position for permitting the sleeve to be moved to its retracted position only when the second valve is in its fully closed position, thereby ensuring that flow through the second passage is completely cut off before the nipple and socket assembly can be connected or disconnected.

16 Claims, 4 Drawing Sheets

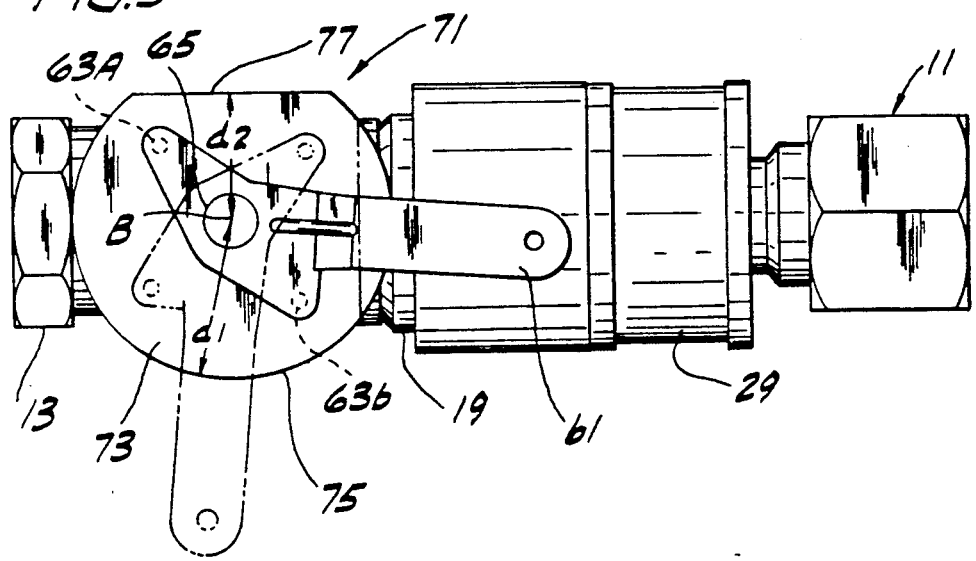
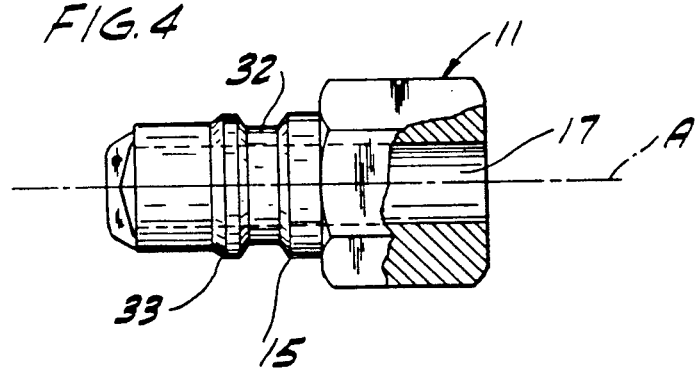
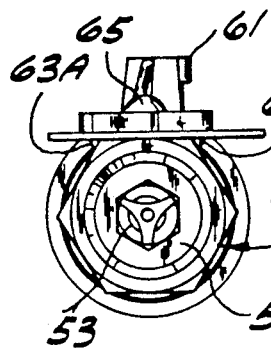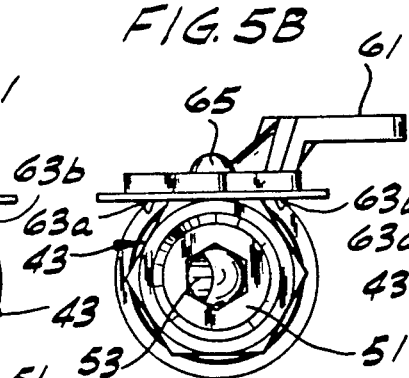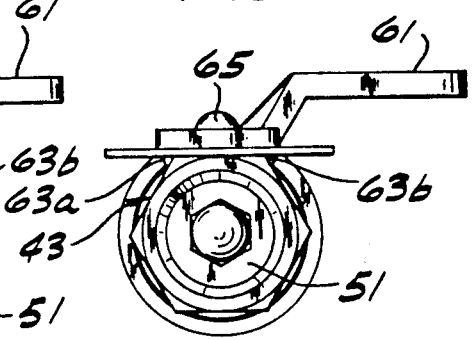

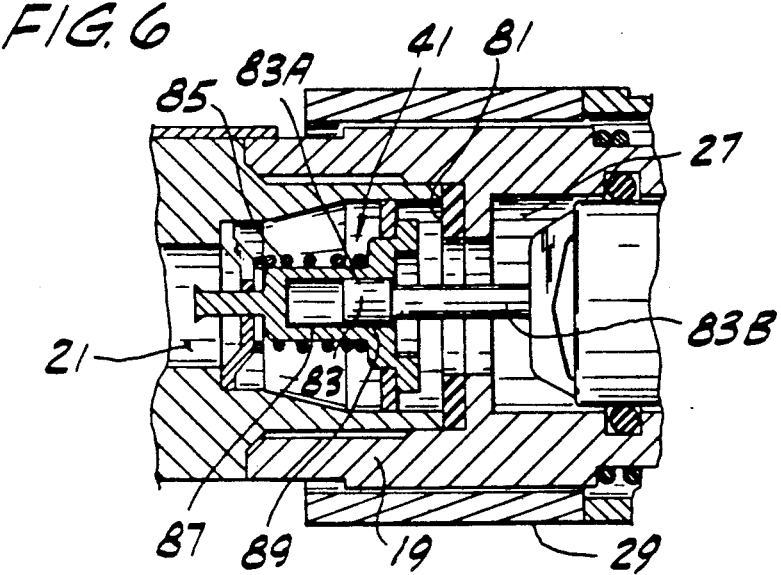
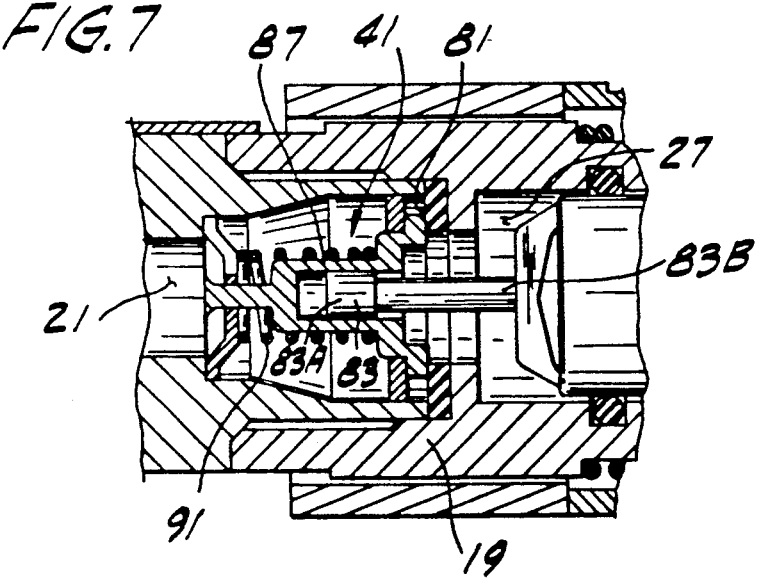

QUICK-CONNECT COUPLING

BACKGROUND OF THE INVENTION

This invention relates generally to quick-connect couplings and more particularly to a quick-connect coupling which is especially adapted for use in applications involving a combustible gas (e.g., natural or LP gas).

Gas appliances such as dryers, stoves and the like are commonplace items in many homes. Typically, an appliance is connected to a gas supply by a coupling comprising various component parts which have to be screwed and unscrewed in order to connect and disconnect the appliance from the source. This is a relatively burdensome and time-consuming task with the potential for leakage if the connection is not tightly secured.

The use of a quick-connect coupling between the gas supply line and the appliance has been suggested as a solution to the above-mentioned problem. One particular coupling which has been proposed for such use includes a socket fitting for connection to the gas line and a plug fitting or nipple for connection to the appliance. The socket fitting has a gas flow passage therethrough, a poppet valve in the flow passage spring biased toward a closed position, and, as required by the National Fuel Gas Code, a manually operable ball valve upstream from the poppet valve, the ball valve being manually movable by means of a lever on the socket fitting from a fully open position, through a range of movement in which it is only partially open, to a fully closed position. The poppet valve automatically opens against the bias of its spring when the nipple component of the coupling is inserted into the socket. A sleeve slidably mounted on the socket fitting is movable from a retracted position for permitting the nipple component to be inserted in the socket, to a locking position in which the nipple is held captive in the socket, and then back to a retracted position for removal of the nipple component from the socket. The nipple component cannot be inserted into the socket to connect the appliance to the gas line unless the sleeve is in its retracted position. Similarly, the components cannot be disconnected unless the sleeve is moved from its locking to its retracted position. In an attempt to avoid leakage of gas during connection and disconnection of the coupling, the design of the coupling is such that the sleeve cannot be moved to its retracted position when the lever of the ball valve is fully open. However, the arrangement is such that the sleeve can be retracted when the ball valve is partially open. As a result, there is risk of leakage of gas during connection and disconnection of the coupling components.

Accordingly, there is a need for a quick-connect coupling which eliminates any risk of gas leakage during connection and disconnection of the appliance to the gas line.

SUMMARY OF THE INVENTION

Among the several objects of this invention may be noted the provision of a quick-connect coupling of the type described above which prevents the connection or disconnection of an appliance to a fuel source unless the flow passage through the coupling is fully closed, thereby avoiding possible gas leakage during such connection and disconnection; the provision of such a coupling which is reliable and safe to use; the provision of such a coupling which is simple in design for economical manufacture; and the provision of such a coupling which automatically cuts off the flow of fuel from the fuel source in the event the coupling temperature exceeds a predetermined temperature.

Generally, a quick-connect coupling of the present invention is used for connecting a fuel source, such as a gas line, to a gas appliance, such as a gas stove or gas dryer. The coupling comprises a nipple adapted for connection to a first conduit, the nipple having a first flow passage therethrough. The coupling further comprises a socket assembly adapted for connection to a second conduit, the socket assembly having a second flow passage therethrough. The socket assembly comprises a socket member with a socket therein for receiving the nipple. A sleeve slidable on the socket member from a retracted position in which the nipple may be inserted into the socket, to a locking position in which the nipple is held captive in the socket with said first and second flow passages communicating with one another, and then back to a retracted position in which the nipple may be removed from the socket. Located within the second flow passage are two valves adjacent one another. The first valve is biased to a closed position and adapted to open upon insertion of the nipple into the socket. The second valve is spaced from the first valve, the second valve being movable from a fully open position for permitting maximum flow of fluid through the second flow passage, through a range of movement in which it is only partially open, to a fully closed position for preventing any flow through the second flow passage. The second valve permits some flow through the second flow passage when it is only partially open. Control means manually movable for opening and closing the second valve is further provided. Detent means movable conjointly with the control means is engageable by the sleeve to prevent the sleeve from being moved to its retracted position when the second valve is fully or partially open. The detent means is movable to a position for permitting the sleeve to be moved to its retracted position only when the second valve is in its fully closed position, thereby ensuring that flow through the second passage is completely cut off before the nipple and socket assembly can be connected or disconnected, thus preventing leakage of fluid past the second valve upon connection or disconnection.

Other objects and features will be in part apparent and in part pointed out hereinafter.

BRIEF DESCRIPTION OF THE DRAWINGS

FIG. 3 is a top view of the coupling;

FIG. 4 is a side elevation of the nipple, portions being broken away to illustrate details;

FIGS. 5A–5C are axial views of the inlet of the coupling showing a shut-off valve in its fully open, partially open and fully closed positions;

FIG. 6 is an enlarged sectional view of the coupling revealing a heat sensitive valve in its open position; and FIG. 7 is a view similar to FIG. 6 showing the heat sensitive valve in its closed position.

Corresponding reference characters indicate corresponding parts throughout the several views of the drawings.

DETAILED DESCRIPTION OF THE PREFERRED EMBODIMENT

Figure 1:
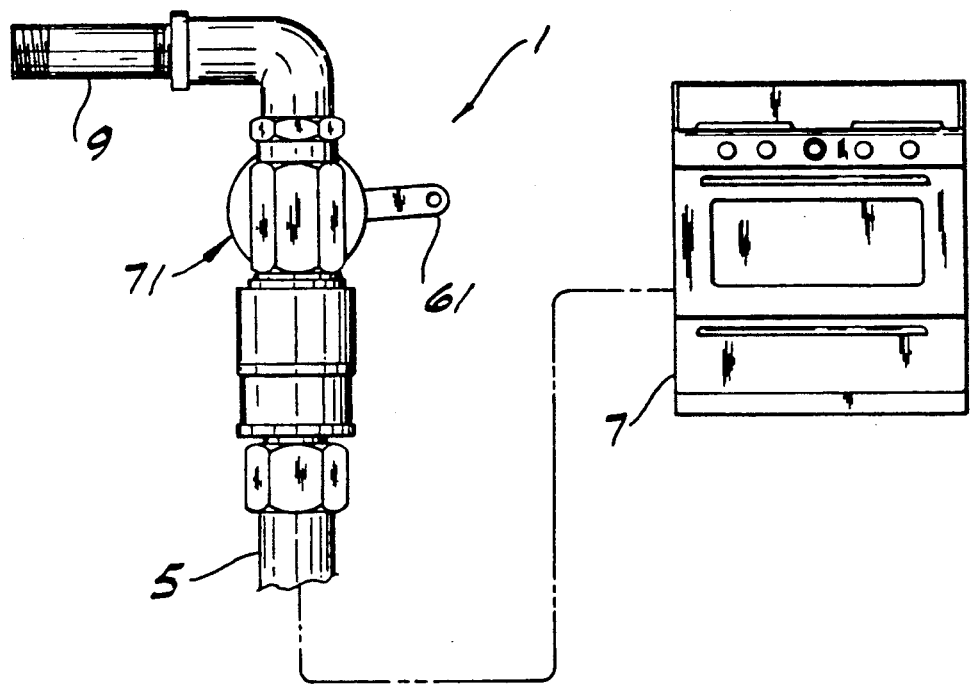
FIG. 1 is a view showing a quick-connect coupling of the present invention connecting a gas source to a gas stove.

Referring now to the drawings, and more particularly to FIG. 1, a quick-connect coupling of the present invention is designated in its entirety by the reference numeral 1 and is shown connecting a gas conduit 5 from a gas appliance 7, such as a gas stove, to a gas line 9 from a fuel source (not shown) containing natural or LP gas. As will appear in more detail hereinafter, this coupling incorporates an unique detent feature for preventing gas leakage when connecting and disconnecting the components of the quick-connect coupling.

Figure 2:
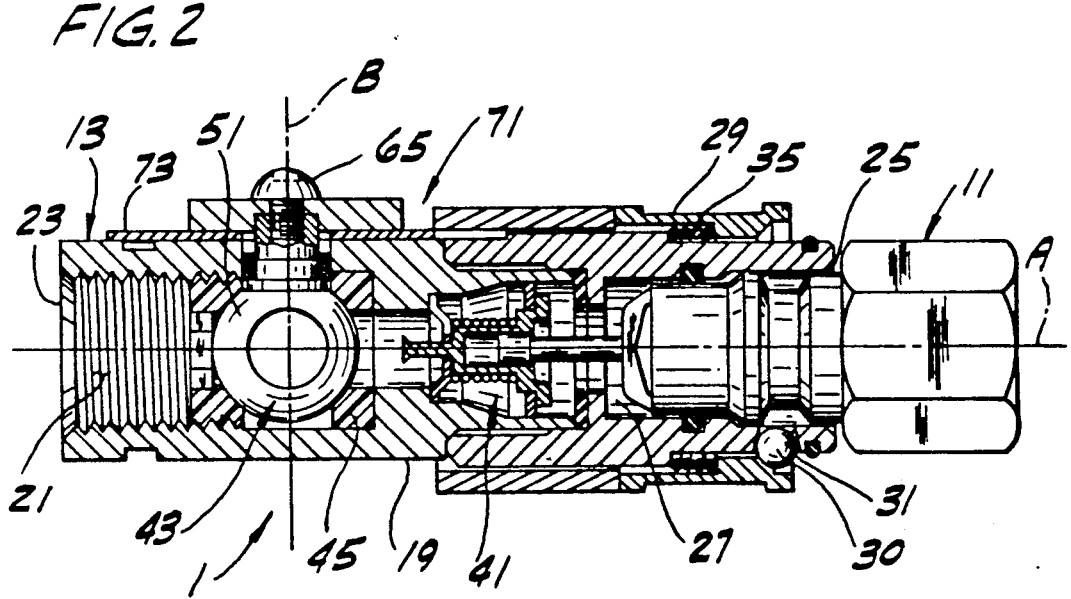
FIG. 2 is an enlarged sectional view of the coupling of FIG. 1 showing a sleeve of a socket member in a retracted position to permit connection and disconnection of the socket member and a nipple.

As illustrated in FIGS. 2 and 3, coupling 1 comprises a nipple generally designated 11 and a socket assembly generally at 13. Nipple 11 comprises an elongate body 15 having a first flow passage therethrough constituted by an axial bore 17 extending from one end of the body to the other along centerline A (see FIG. 4). The left or upstream end of the nipple body is conical in shape and its right or downstream end is formed (e.g., internally threaded) for connection to conduit 5.

Figure 2A:
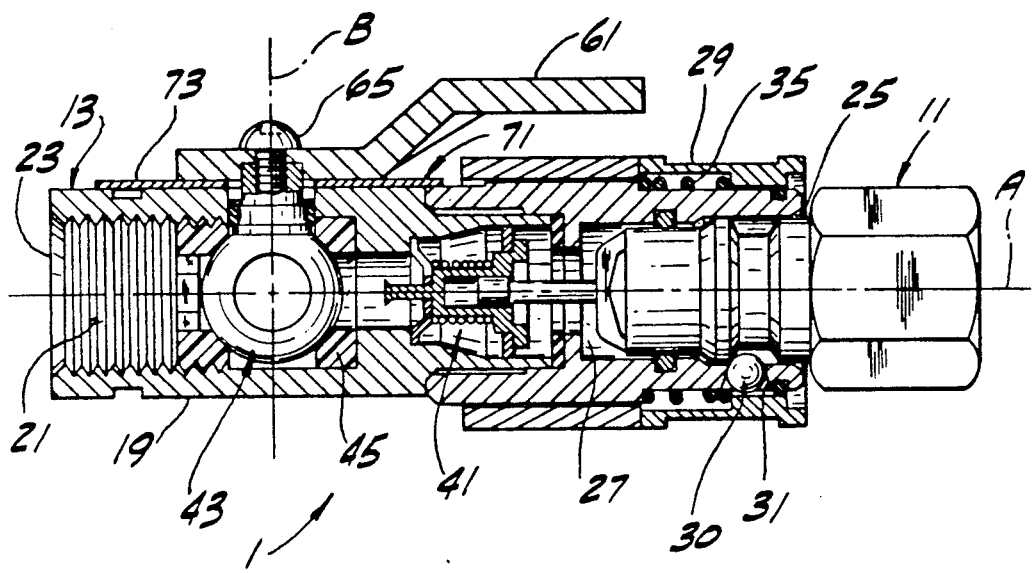
FIG. 2A is a view similar to FIG. 2 with the sleeve shown in a locking position and locking the nipple to the socket member.
Figure 2B:
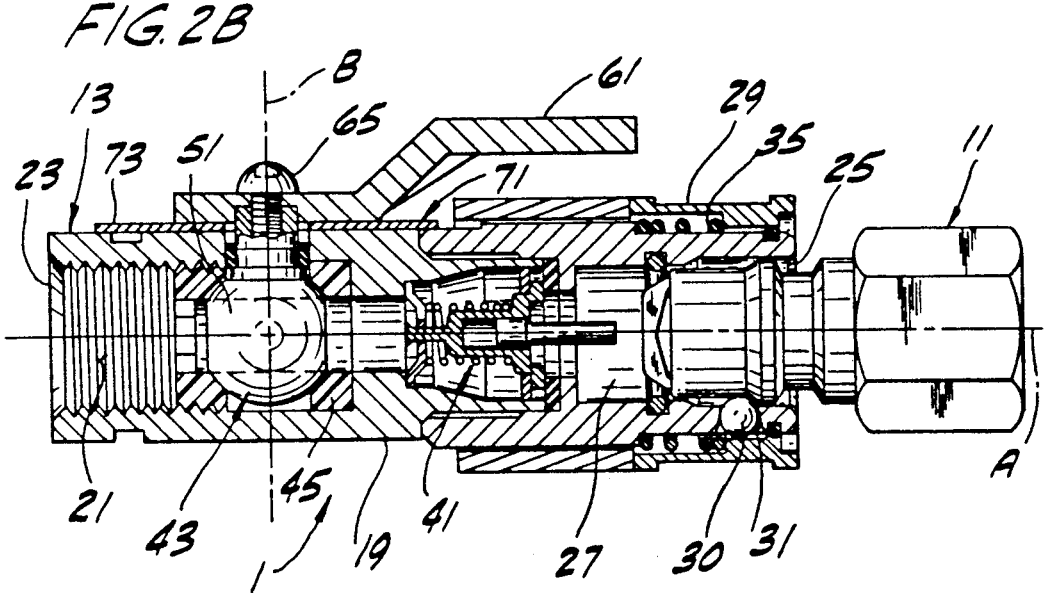
FIG. 2B is a view similar to FIG. 2 with the sleeve shown in its locking position and preventing the nipple from being inserted into the socket member.

Socket assembly 13 comprises a two-piece socket member 19 having a second flow passage therethrough constituted by a bore 21 extending axially from one end of the member to the other. The bore 21 has an inlet 23 and an outlet 25 downstream from the inlet, the outlet having formed therein a generally cylindric chamber 27 for receiving the left (upstream) end of nipple body 15. A sleeve 29 is provided for holding the nipple 11 captive in the socket chamber 27. Sleeve 29 is slidably mounted on the socket member 19 to move axially with respect to the socket member from a retracted position (FIG. 2) in which the nipple 11 may be inserted into the socket chamber 27, to a locking position (FIG. 2A) in which the nipple is held captive in the socket, and then back to a retracted position (FIG. 2) in which the nipple may be removed from the socket. A spring 35 disposed between the sleeve and the outlet end of the socket member 19 biases the sleeve 29 to move toward its locking position. A plurality of detent balls, each designated 30, are mounted in holes 31 spaced at intervals around the circular wall of the socket chamber 27 adjacent the outlet end of the socket member 19. These balls 30 are free to move radially with respect to the socket member between a radially inward position in which they are adapted to be received in a circumferential groove 32 in the nipple body 15 to hold the nipple 11 captive in the socket chamber 27, and a radially outward position in which they are removed from the groove 32. When sleeve 29 is moved to its retracted position against the bias of spring 35, nipple 11 may be inserted into the socket chamber 27. As the nipple moves into the chamber, an annular flange 33 on the nipple body 15 engages the detent balls 30 and forces them toward their stated radially outward position, thereby allowing the nipple to be fully inserted into the socket chamber. The sleeve 29 may then be allowed to return to its locking position (under the urging of spring 35) in which balls 30 are forced radially inwardly by the inside surface of the sleeve into groove 32 for holding nipple 11 captive in the socket chamber 27 (see generally FIGS. 2–2B).

The socket assembly 13 further comprises two valves generally designated 41, 43 located within the flow passage 21 of socket member 19. The first valve 41 is located within bore 21 immediately upstream from the socket chamber 27 and is biased to a closed position; it is adapted to open upon insertion of the nipple 11 into the socket chamber 27. The second valve 43 is also located within bore 21 upstream from valve 41. The second valve 43 is a manually operable shut-off valve movable from a fully open position (FIG. 5A) for permitting maximum flow of gas through the bore 21, through a range of movement in which it is only partially open (e.g., FIG. 5B), to a fully closed position for preventing any flow (FIG. 5C). In its most preferred embodiment, valve 43 is seated within a housing 45 in the socket member 19 and comprises a ball valve 51 rotatable in the housing 45 on an axis B, the ball valve having a bore 53 therethrough. As shown in FIGS. 5A–5C, the ball valve bore 53 is (A) aligned with bore 21 when the ball valve is in its fully open position, (B) skewed relative to the bore when the valve is in its partially open position, and (C) generally perpendicular to the bore when the valve is in its fully closed position. Valve 43 permits some flow or leakage through the bore 21 when it is only partially open (e.g., FIG. 5B).

A lever 61 is pivoted on the exterior of the socket member 19 on axis B for moving the ball valve 43 between its fully open and fully closed position. The lever is affixed at its pivoted end to the socket member by a screw 65 threadably connected to the ball valve 43. A pair of stops 63a, 63b limit pivotal movement of the lever 61 to movement through an angle (approximately 90° as illustrated in FIG. 3), the extremities of which correspond to the fully open and fully closed positions of the ball valve 43. The stops extend down from the bottom surface of lever 61 for engagement with the exterior surface of socket member 21 to limit the movement of the lever (see FIGS. 5A–5C).

Generally indicated at 71 in FIGS. 2 and 3 is detent means movable conjointly with the lever 61. Detent means 71 is engageable by the sleeve 29 to prevent the sleeve from being moved to its retracted position when the shut-off valve 43 is fully or partially open. Means 71 is movable to a position for permitting the sleeve 29 to be moved to its retracted position only when the ball valve 43 is in its fully closed position. This limitation ensures that flow through bore 21 is completely cut off before the nipple 11 and socket assembly 13 can be either connected or disconnected, thus preventing leakage of gas past the ball valve upon connection or disconnection.

In its most preferred embodiment, detent means 71 comprises a detent member 73 mounted for conjoint pivotal movement with the lever 61 on pivot axis B. As illustrated in FIG. 3, detent member 73 is a part-circular plate pivotably secured to the socket member 19 by screw 65 in a position between the lever 61 and the socket member 19. The plate lies in a plane generally perpendicular to the pivot axis B and has edge means comprising first and second edges designated 75 and 77, respectively. Edge 75 is configured for engagement by the sleeve 29 to prevent retraction of the sleeve when the lever 61 is in any position except the one corresponding to the fully closed position of the ball valve 43 (shown by phantom lines in FIG. 3). More specifically, edge 75 is an arcuate edge centered on pivot axis B and spaced a first distance d1 from the pivot axis. Edge 77 is a substantially straight edge spaced from the pivot axis B a second distance d2 less than the first distance d1. When the lever 61 is pivoted to move the ball valve 43 to its fully closed position, the substantially straight edge 77 is generally adjacent but spaced from the sleeve 29 a distance sufficient to permit the sleeve to be retracted. This is best observed by viewing the phantom position of the detent plate 73 in FIG. 3, where edge 77 is generally perpendicular to the axis A of the flow passage 21, thus providing sufficient clearance for the sleeve to be retracted against the bias of its spring 35. It will be understood that the detent member 73 may have other configurations without departing from the scope of this invention so long as it functions to prevent the sleeve 29 from being retracted unless the ball valve 43 is in its fully closed position.

In the embodiment shown, stops 63a, 63b extend through openings located in detent member 73. Stops 63 may alternatively be located on the bottom surface of the detent member 73 for engagement with the exterior surface of socket member 19 to limit the pivotal movement of the detent member and lever 61 to movement through an angle, the extremities of which correspond to the fully open and fully closed positions of the ball valve. In this alternative design, the stops 63a and 63b would project down from the relatively flat plane of the detent plate 73 to engage the exterior of housing 45.

Referring now to FIGS. 6 and 7, the first valve 41, when in its open position, is adapted to move to its closed position upon being heated to a temperature in excess of a predetermined temperature, thereby blocking bore 21. Valve 41 is preferably a poppet valve which seats against a valve seat 81 formed in bore 21 at the bottom of the socket chamber 27 in the socket member. Valve 41 comprises a valve stem 83 having an upstream portion 83A located upstream from the valve seat 81, and a downstream portion 83B projecting downstream past the valve seat 81 into chamber 27 of socket 19. A valve sealing member 87 is secured to the upstream portion 83A of the valve stem 83 by a heat-sensitive means 89 which holds the valve sealing member in a fixed position relative to the valve stem. A spring 85 urges the valve sealing member 87 toward the valve seat 81. Without the heat-sensitive means 89 holding the valve stem 83 in a fixed position to the valve sealing member 87, the valve sealing member under the urging of spring 85 would engage valve seat 81 to cut off flow past the valve seat (see FIG. 7).

The downstream portion 83B is engageable by the nipple 11 when the nipple is inserted into the socket chamber 27 for pushing the valve sealing member 87 away from the valve seat 81, thus permitting flow through the bore 21 past the valve seat (FIG. 6). The heat-sensitive means 89 is adapted to melt when heated to a temperature in excess of a predetermined temperature thereby allowing the valve sealing member 87 to move relative to the valve stem 83 under the urging of the spring 85 into engagement with the valve seat 81, thus cutting off flow through bore 21. As disclosed in my U.S. Pat. No. 4,290,440, heat-sensitive means 89 may be a solder bond that melts at a relatively low temperature (e.g., 220° F.) well below the temperature at which the gas flowing through the assembly would ignite. The solder used for this bond is preferably a eutectic solder (such as that sold under the trade designation "212° fuseable metal—Alloy No. 3940-1" by Metal Specialties Co. of Fairfield, Conn. and Cerro Copper Products of East St. Louis, Ill.) adapted to melt within a relatively narrow temperature range of 10° F. or less (e.g., 220° F.-230° F.).

It will be understood that heat sensitive valves having other constructions may be used in place of valve 41 without departing from the scope of this invention so long as the valve functions to close flow passage 21 upon being heated to a temperature in excess of a predetermined temperature. An example of such a valve is shown in my U.S. Pat. No. 4,974,623, incorporated herein by reference.

In view of the above, it will be seen that the several objects of the invention are achieved and other advantageous results attained.

As various changes could be made in the above constructions without departing from the scope of the invention, it is intended that all matter contained in the above description as shown in the accompanying drawing shall be interpreted as illustrative and not in a limiting sense.

What is claimed is:

1. A quick-connect coupling comprising:

a nipple adapted for connection to a first conduit, said nipple having a first flow passage therethrough, a socket assembly adapted for connection to a second conduit, the socket assembly having a second flow passage therethrough, said socket assembly comprising a socket member with a socket therein for receiving the nipple, a sleeve slidable on the socket member from a retracted position in which the nipple may be inserted into the socket, to a locking position in which the nipple is held captive in the socket with said first and second flow passages communicating with one another, and then back to a retracted position in which the nipple may be removed from the socket, a first valve in the second flow passage biased to a closed position and adapted to open upon insertion of the nipple into the socket, a second valve in the second flow passage spaced from the first valve, said second valve being movable from a fully open position for permitting maximum flow of fluid through the second flow passage, through a range of movement in which it is only partially open, to a fully closed position for preventing any flow through the second flow passage, said second valve permitting some flow through the second flow passage when it is only partially open, a housing for said second valve, said second valve comprising a ball valve movable in the housing and having a bore therethrough, the bore being (a) aligned with the second flow passage when the ball valve is in its fully open position, (b) skewed relative to the second flow passage when the valve is in its partially open position, and (c) generally perpendicular to the second flow passage when the valve is in its fully closed position, control means manually movable for opening and closing the second valve, said control means comprising a lever pivoted on the socket assembly for moving the second valve between its fully open and fully closed positions, and detent means movable conjointly with said control means, said detent means being engageable by the sleeve to prevent the sleeve from being moved to its retracted position when the second valve is fully or partially open, and being movable to a position for permitting the sleeve to be moved to its retracted position only when the second valve is in its fully closed position, thereby ensuring that flow through the second passage is completely cut off before the nipple and socket assembly can be connected or disconnected, thus preventing leakage of fluid past the second valve upon connection or disconnection, said detent means comprising a detent member mounted for conjoint pivotal movement with the lever on a pivot axis, said detent member having edge means configured for engagement by the sleeve to prevent retraction of the sleeve when the lever is in any position except one corresponding to said fully closed position of the ball valve, said edge means being configured to be sufficiently clear of the sleeve when the lever is moved to a position corresponding to the ball valve being fully closed to permit the sleeve to be retracted.

2. A coupling as set forth in claim 1 further comprising stops for limiting pivotal movement of the lever to movement through an angle the extremities of which correspond to said fully open and fully closed positions of the ball valve.

3. A coupling as set forth in claim 1 wherein said edge means comprises an arcuate edge centered on said pivot axis and spaced a first distance from the pivot axis, said arcuate edge being engageable by the sleeve to prevent retraction of the sleeve as the lever is pivoted to move the ball valve from its fully open position and through its partially open position toward its fully closed position, and being movable out of engagement with the sleeve when the lever is pivoted to move the ball valve to its fully closed position thereby to permit retraction of the sleeve.

4. A coupling as set forth in claim 3 wherein said detent member is a part-circular plate lying in a plane generally perpendicular to said pivot axis, said plate having said arcuate edge, and said edge means further comprising a second edge on the plate spaced from said pivot axis a second distance less than said first distance, the arrangement being such that when the lever is pivoted to move the ball valve to its fully closed position, the second edge is generally adjacent but spaced from the sleeve a distance sufficient to permit the sleeve to be retracted.

5. A coupling as set forth in claim 4 further comprising a pair of stops associated with said detent member and engageable with said housing to limit pivotal movement of the detent member and lever to movement through an angle the extremities of which correspond to said fully open and fully closed positions of the ball valve.

6. A coupling as set forth in claim 1 wherein the first valve, when in its open position, is adapted to move to its closed position upon being heated to a temperature in excess of a predetermined temperature, thereby blocking the second flow passage.

7. A coupling as set forth in claim 6 further comprising a valve seat in the second passage at the bottom of the socket in the socket member, said first valve comprising a valve stem at one side of the valve seat opposite the socket and having a portion projecting past the valve seat into the socket, a valve sealing member mounted on the valve stem at said one side of the valve seat, heat-sensitive means holding the valve sealing member in fixed position relative to the valve stem, and a spring urging the valve sealing member toward the valve seat, said portion of the valve stem projecting into the socket being engageable by the nipple when it is inserted into the socket for pushing the valve stem to move the valve sealing member away from the valve seat to permit flow through the second passage past the valve seat, said heat-sensitive means being adapted to melt when heated to a temperature in excess of a predetermined temperature thereby allowing the valve sealing member to move relative to the valve stem under the urging of the spring into engagement with the valve seat thereby to cut off flow past the valve seat.

8. A coupling as set forth in claim 7 wherein said valve sealing member has a socket therein for receiving the valve stem, and said heat-sensitive means comprises a plug of heat-sensitive material disposed in the socket in the valve sealing member between the valve stem and the bottom of the socket, said plug being adapted to melt when heated to a temperature in excess of said predetermined temperature to permit the valve stem to penetrate further into the socket and thus allow the valve sealing member to move into engagement with the valve seat.

9. A quick-connect coupling for connecting a gas conduit from a gas appliance or the like to a gas line for providing gas to the appliance comprising:

a nipple adapted for connection to a first conduit, said nipple having a first flow passage therethrough, a socket assembly adapted for connection to a gas line, the socket assembly having a second flow passage therethrough upstream from said first flow passage, said socket assembly comprising a socket member with a socket therein for receiving the nipple, a sleeve slidable on the socket member from a retracted position in which the nipple may be inserted into the socket, to a locking position in which the nipple is held captive in the socket with said first and second flow passages communicating with one another, and then back to a retracted position in which the nipple may be removed from the socket, a first valve in the second flow passage biased to a closed position and adapted to open upon insertion of the nipple into the socket, a second valve in the second flow passage upstream from the first valve, said second valve being movable from a fully open position for permitting maximum flow of fluid through the second flow passage, through a range of movement in which it is only partially open, to a fully closed position for preventing any flow through the second flow passage, said second valve permitting some flow through the second flow passage when it is only partially open, a housing for said second valve, said second valve comprising a ball valve movable in the housing and having a bore therethrough, the bore being (a) aligned with the second flow passage when the ball valve is in its fully open position, (b) skewed relative to the second flow passage when the valve is in its partially open position, and (c) generally perpendicular to the second flow passage when the valve is in its fully closed position, control means manually movable for opening and closing the second valve, said control means comprising a lever pivoted on the socket assembly for moving the second valve between its fully open and fully closed positions, and detent means movable conjointly with said control means, said detent means being engageable by the sleeve to prevent the sleeve from being moved to its retracted position when the second valve is fully or partially open, and being movable to a position for permitting the sleeve to be moved to its retracted position only when the second valve is in its fully closed position, thereby ensuring that flow through the second passage is completely cut off before the nipple and socket assembly can be connected or disconnected, thus preventing leakage of gas past the second valve upon connection or disconnection, said detent means comprising a detent member mounted for conjoint pivotal movement with the lever on a pivot axis, said detent member having edge means configured for engagement by the sleeve to prevent retraction of the sleeve when the lever is in any position except one corresponding to said fully closed position of the ball valve, said edge means being configured to be sufficiently clear of the sleeve when the lever is moved to a position corresponding to the ball valve being fully closed to permit the sleeve to be retracted.

10. A coupling as set forth in claim 9 further comprising stops for limiting pivotal movement of the lever to movement through an angle the extremities of which correspond to said fully open and fully closed positions of the ball valve.

11. A coupling as set forth in claim 9 wherein said edge means comprises an arcuate edge centered on said pivot axis and spaced a first distance from the pivot axis, said arcuate edge being engageable by the sleeve to prevent retraction of the sleeve as the lever is pivoted to move the ball valve from its fully open position and through its partially open position toward its fully closed position, and being movable out of engagement with the sleeve when the lever is pivoted to move the ball valve to its fully closed position thereby to permit retraction of the sleeve.

12. A coupling as set forth in claim 11 wherein said detent member is a part-circular plate lying in a plane generally perpendicular to said pivot axis, said plate having said arcuate edge, and said edge means further comprising a second edge on the plate spaced from said pivot axis a second distance less than said first distance, the arrangement being such that when the lever is pivoted to move the ball valve to its fully closed position, the second edge is generally adjacent but spaced from the sleeve a distance sufficient to permit the sleeve to be retracted.

13. A coupling as set forth in claim 12 further comprising a pair of stops associated with said detent member and engageable with said housing to limit pivotal movement of the detent member and lever to movement through an angle the extremities of which correspond to said fully open and fully closed positions of the ball valve.

14. A coupling as set forth in claim 9 wherein the first valve, when in its open position, is adapted to move to its closed position upon being heated to a temperature in excess of a predetermined temperature, thereby blocking the second flow passage.

15. A coupling as set forth in claim 14 further comprising a valve seat in the second passage at the bottom of the socket in the socket member, said first valve comprising a valve stem at one side of the valve seat opposite the socket and having a portion projecting past the valve seat into the socket, a valve sealing member mounted on the valve stem at said one side of the valve seat, heat-sensitive means holding the valve sealing member in fixed position relative to the valve stem, and a spring urging the valve sealing member toward the valve seat, said portion of the valve stem projecting into the socket being engageable by the nipple when it is inserted into the socket for pushing the valve stem to move the valve sealing member away from the valve seat to permit flow through the second passage past the valve seat, said heat-sensitive means being adapted to melt when heated to a temperature in excess of a predetermined temperature thereby allowing the valve sealing member to move relative to the valve stem under the urging of the spring into engagement with the valve seat thereby to cut off flow past the valve seat.

16. A coupling as set forth in claim 15 wherein said valve sealing member has a socket therein for receiving the valve stem, and said heat-sensitive means comprises a plug of heat-sensitive material disposed in the socket in the valve sealing member between the valve stem and the bottom of the socket, said plug being adapted to melt when heated to a temperature in excess of said predetermined temperature to permit the valve stem to penetrate further into the socket and thus allow the valve sealing member to move into engagement with the valve seat.

* * * * *

UNITED STATES PATENT AND TRADEMARK OFFICE
CERTIFICATE OF CORRECTION

PATENT NO. : 5,172,723

DATED : December 22, 1992

INVENTOR(S) : Malcolm B. Sturgis

It is certified that error appears in the above-identified patent and that said Letters Patent is hereby corrected as shown below:

Column 8, claim 9, line 31, "connection to a first conduit, said" should read ---connection to a gas appliance, said---.

Signed and Sealed this

Second Day of November, 1993

Attest:

BRUCE LEHMAN

Attesting Officer     Commissioner of Patents and Trademarks